(12) United States Patent
Bel Fdhila et al.

(10) Patent No.: US 9,045,810 B2
(45) Date of Patent: Jun. 2, 2015

(54) METHOD FOR MELTING STEEL

(71) Applicants: Rebei Bel Fdhila, Vasteras (SE); Jan-Erik Eriksson, Vasteras (SD); Olof Hjortstam, Vasteras (SE); Mohamed Ali Rahmani, Vasteras (SE); Shiva Sander-Tavallaey, Taby (SE); Ola Widlund, Hagersten (SE); Hongliang Yang, Vasteras (SE); Xiaojing Zhang, Vasteras (SE)

(72) Inventors: Rebei Bel Fdhila, Vasteras (SE); Jan-Erik Eriksson, Vasteras (SD); Olof Hjortstam, Vasteras (SE); Mohamed Ali Rahmani, Vasteras (SE); Shiva Sander-Tavallaey, Taby (SE); Ola Widlund, Hagersten (SE); Hongliang Yang, Vasteras (SE); Xiaojing Zhang, Vasteras (SE)

(73) Assignee: ABB RESEARCH LTD. (CH)

( * ) Notice: Subject to any disclaimer, the term of this patent is extended or adjusted under 35 U.S.C. 154(b) by 0 days.

(21) Appl. No.: 14/323,671

(22) Filed: Jul. 3, 2014

(65) Prior Publication Data
US 2014/0318314 A1 Oct. 30, 2014

Related U.S. Application Data

(63) Continuation of application No. PCT/EP2012/050053, filed on Jan. 3, 2012.

(51) Int. Cl.
| | |
|---|---|
| C21B 13/12 | (2006.01) |
| C21C 7/00 | (2006.01) |
| C22B 9/20 | (2006.01) |
| C21C 5/52 | (2006.01) |
| F27D 27/00 | (2010.01) |
| F27D 19/00 | (2006.01) |

(52) U.S. Cl.
CPC . *C22B 9/20* (2013.01); *C21B 13/12* (2013.01); *C21C 2300/06* (2013.01); *C21B 2300/04* (2013.01); *C21C 5/527* (2013.01); *C21C 2005/5276* (2013.01); *F27D 27/00* (2013.01); *C21C 2005/5288* (2013.01); *F27D 2019/0003* (2013.01); *C21C 7/00* (2013.01)

(58) Field of Classification Search
CPC ............ C21C 7/00; C22B 9/20; C21B 13/12; C21B 2300/04
USPC ............................................ 75/10, 12, 10.66
See application file for complete search history.

(56) References Cited

U.S. PATENT DOCUMENTS 3,409,726 A * 11/1968 Abe et al. ......................... 373/85
3,690,867 A * 9/1972 Sibakin et al. ............... 75/10.47
(Continued)

FOREIGN PATENT DOCUMENTS

| | | |
|---|---|---|
| CH | 251938 A | 11/1947 |
| DE | 3440820 A1 | 5/1986 |

(Continued)

OTHER PUBLICATIONS

Nyssen, et al.; "A New Metallurgical Model for the Control of EAF Operations"; Mar. 8, 2004; 18 pages.
(Continued)

*Primary Examiner* — George Wyszomierski
*Assistant Examiner* — Tima M McGuthry Banks
(74) *Attorney, Agent, or Firm* — St. Onge Steward Johnston & Reens LLC

(57) ABSTRACT

A method for melting steel in an electric arc furnace (EAF). A hot heel is provided in the EAF. Metal scrap is loaded into the EAF. The metal scrap is melted in the EAF. The mass of the hot heel in relation to the mass of the metal scrap that is initially beyond the surface of the hot heel is a certain minimum. This minimum is 0.75 times the relation between the heat required to melt the metal scrap beyond the surface of the hot heel and the heat that can be taken from the hot heel without it being solidified when a theoretical heat balance calculation is applied as defined in a formula.

13 Claims, 1 Drawing Sheet

(56) References Cited

U.S. PATENT DOCUMENTS

| | | | |
|---|---|---|---|
| 3,772,000 A * | 11/1973 | Hyde et al. | 75/529 |
| 6,026,113 A * | 2/2000 | Pavlicevic et al. | 373/85 |
| RE37,897 E * | 11/2002 | Kremer et al. | 75/10.42 |
| 2008/0267250 A1* | 10/2008 | Argenta et al. | 373/80 |
| 2011/0174457 A1* | 7/2011 | Abraham et al. | 164/4.1 |

FOREIGN PATENT DOCUMENTS

| | | | |
|---|---|---|---|
| DE | 9422137 U1 | | 6/1998 |
| GB | 1601490 A | | 10/1981 |
| GB | 2192446 A | | 1/1988 |
| GB | 201218889 | * | 12/2012 |
| GB | 2507116 A | * | 2/2014 |
| WO | 03095685 A1 | | 11/2003 |

OTHER PUBLICATIONS

International Preliminary Report on Patentability Application No. PCT/EP2012/050053 Completed: Dec. 17, 2013 12 pages.

International Search Report and Written Opinion of the International Searching Authority Application No. PCT/EP2012/050053 Completed: Jun. 14, 2012; Mailing Date: Jun. 21, 2012 11 pages.

* cited by examiner

METHOD FOR MELTING STEEL

FIELD OF THE INVENTION

The present invention relates to a method for melting steel in an electric arc furnace (EAF), which method includes the steps of
providing a hot heel in the EAF,
loading metal scrap into the EAF, and
melting the metal scrap in the EAF.

BACKGROUND OF THE INVENTION

EAF steelmaking is a highly energy-intensive process. It consumes a large amount of electrical and chemical energy. The hot heel is the liquid steel remaining in the furnace after the preceding melting operation. Such a hot heel is remaining in many traditional steel melting processes due to practical aspects. When a steel melting process is completed the melted steel traditionally was discharged simply by tilting the furnace, whereby a part of the melted steel due to the geometry of the furnace was left. A further reason for maintaining a hot heel has been to avoid too large temperature fluctuations in the walls of the furnace. A positive effect of the hot heel is further that electric energy supplied for the melting process can be reduced.

In order to provide optimal conditions for the process it is advantageous to provide stirring of the melt. This is because without stirring, the melt is so stagnant that it leads to severe problems. Cold spots due to non-uniform melting occur. In order to reach a desired steel quality, the melting time and bath temperature have to be increased to reach a flat bath. This results in high energy consumption. Further, it takes long time for large pieces of scrap to be melted. Severe thermal stratification of the steel melt with high bath temperature gradient will occur. The gradients cause uneven reaction area.

By stirring such related problems can be eliminated or at least reduced. Known main technologies applied for stirring are electromagnetic stirring (EMS) and gas stirring. Gas stirring has some disadvantages in comparison with EMS.

EMS can move solid scrap transversely, which is not the case for gas stirring. EMS has better stirring effect for scrap melting. The stirring effect of gas stirring is also limited due to insufficiency of fitting EAF geometry. Gas stirring has low reliability due to maintenance and operation difficulties and entails the risk for bottom inject hole blocking. Leakage of molten steel from gas injection holes might occur.

For an effective EMS it is necessary to have a substantial part of the furnace content to be in liquid state. With a hot heel of a size traditionally applied, the charging of scrap into the hot heel results in that at least part of the hot heel solidifies since it is cooled down by the scrap. Then the proportion of the liquid state will gradually increase due to the heating by the electric arc and it will take some time until the liquid fraction is sufficiently large to effectively start the EMS. This is normally not present until a large part of the process has passed, typically about 40-50% of the total process time. With process time is normally meant the time span from the initial charging of the furnace with the metal scrap until the molten steel is discharged therefrom, and this is the meaning also in the present application.

The benefits from applying EMS therefore are gained only during a part of the process.

An illustrative example of prior art is disclosed in GB 2192446 A describing a steel melting process applying gas stirring. The furnace operates with a hot heel of a limited size that is mentioned in the disclosure to be in the range of 10 to 30% of the previous charge. As mentioned above, the mass of such a limited hot heel is normally not sufficient to avoid solidification of parts of the hot heel when the scrap is charged. Stirring at an early stage of the process therefore will not be effective, in particular not when using EMS.

DE 9422137 U1 also discloses a melting process in which a hot heel is maintained from the previous process cycle. The mass of the hot heel is not defined and if the hot heel has a mass within the range conventionally present it would not be sufficient to avoid solidification of at least parts of the hot heel.

EMS stirring as such is disclosed e.g. in GB 1601490.

SUMMARY OF THE INVENTION

One object of the present invention is to improve a steel making process of the kind in question. More specific, the object is to reduce the consumption of electric energy for the process. In particular, the object is to make it possible to effectively apply EMS during a larger part of the process, preferably during the complete process.

This object is achieved in that a method of the kind specified in the introduction of this description includes the further specific steps of providing the hot heel in an amount corresponding to the formula:

$$m_h = R \frac{(T_m - T_s) \times C_p^s}{(T_h - T_m) \times C_p^l + Q} m_s$$

where $m_h$ is the mass of the hot heel provided, $m_s$ the mass of the initially loaded scrap that is beyond the surface of the hot heel, $T_m$ is the melting temperature of the scrap, $T_s$ is the temperature of the scrap at loading thereof, $T_h$ is the temperature of the hot heel at the loading of the scrap, $C_p^s$, is the specific heat capacity of the scrap, $C_p^l$ is the specific heat capacity of the hot heel, Q is the specific melt heat for the scrap and R is a coefficient that is at least 0.75, and in that electromagnet stirring is applied to the process.

The term "hot heel" conventionally means the liquid steel that is left in the furnace after discharging in the previous process. This is also understood by the term in the present application. However, in the present application this term is to be understood as the amount of liquid metal being present in the furnace irrespective of where it comes from. The term "hot heel" in this application thus includes any liquid steel that is initially supplied to the furnace as an addition to the liquid steel from the preceding process or even instead of the liquid steel from the preceding process.

The formula specifies a minimum for the mass of the hot heel in relation to the mass of the steel in dependence of the thermal conditions that are present. The minimum according to the formula represents a hot heel mass that is large enough for attaining a sufficient amount of the liquid state that allows an effective application of EMS at a much earlier stage in the process than is possible with a hot heel of the size that conventionally is present. The advantages of the EMS therefore is gained during a much larger part of the total process time resulting in a more effective process with regards to the consumption of electric energy.

The formula is based on the calculation of heat balance between on one hand the heat required to heat the mass of scrap beyond the hot heel surface up to melting temperature and on the other hand the heat that can be withdrawn from the hot heel without it being solidified. The theoretical equilibrium occurs when R=1.

However, in practice the theoretical equilibrium will not exactly reflect what will happen during the initial part of the process but is rather to be considered as a rough guidance. There are factors influencing the process at this stage that tend to result in solidification in spite of the heat balance. Most important in this respect is the fact that the heat transfer from the hot heel to the scrap is not uniform. Some parts of the hot heel thus might be cooled down earlier than others. The uneven cooling of the hot heel thereby will result in that parts thereof will solidify in spite of the presence of sufficient amount thereof to theoretically keep it in liquid stage.

Other factors have the opposite effect. The electric arc is ignited already at the beginning of the process. Thereby a continuous heat supply is provided which adds to the heat potential of the hot heel. Considering this effect, the heat balance is affected in a direction preventing solidification of the hot heel. This effect thus means that the hot heel will maintain in liquid stage even for a value of R that is lower than 1.

The sum of these two effects is time-dependent and is also dependent on various prevailing conditions. It is therefore hard to calculate and cannot easily be generalized. The minimum value $R=0.75$ specified for the general presentation of the invention represent a condition where the second influence above is given the highest weight and the first influence is small. For optimal process conditions with regards to the heat balance during the initial stage this value of R should be sufficient to maintain the hot heel in liquid stage. Some minor local solidified spots in the hot heel might occur, but not to the extent that it significantly reduces the effect of the EMS.

Through the method according to the invention where the EMS can be applied at earlier stage than according to prior art many benefits are achieved:

- A large energy saving through efficient scrap melting during full operation cycle or at least a larger part thereof than according to prior art.
- Increased yield of iron and alloys.
- Increased productivity through shorter tap to tap times.
- Reduced oxygen consumption by fully used advantages of the hot heel together with the EMS.
- Reduced tap hole wear.
- Reduced electrode consumption due to less scrap movements.
- Reduced risk of electrode breakage.
- Higher power input can be applied at earlier stage.
- Improved arc stability.
- Reduced power on time.
- Prevention of slag carry over.
- Improved end point control accuracy and reliability.
- EMS slag position to push slag to slag door for slag removal.
- Longer slag-metal interface reaction time and uniform reaction area.
- Increased efficiency of melting and bath homogenization.
- Shorter process cycle time.

According to a preferred embodiment R is at least 1.

This embodiment means that the minimum relative mass of the hot heel is somewhat larger than what is specified for the invention in its most generalized form. As described above R=1 represents the heat equilibrium when considering only the heat content of the hot heel and the scrap, respectively. This embodiment thereby is safer with respect to avoid solidification of parts of the hot heel and is based on the presumption that the effect of non-homogenous cooling of the hot heel and the effect of the heat supplied by the electric arc roughly balance each other. There will thus be a higher degree of certainty to benefit from the advantages with EMS.

According to a further preferred embodiment R is at least 1.2.

This embodiment provides a still greater margin against the risk for solidifications in the hot heel since the theoretical heat content of the hot heel is 20% higher than what is theoretically required to maintain it liquid. Even in cases where the effect of non-homogenous solidification might dominate in comparison with the effect of the heat supply from the electric arc, the hot heel will remain substantially liquid.

According to a further preferred embodiment the mass of the hot heel is less than 1.5 times the minimum specified according to the invention.

The presence of a minimum of hot heel is stipulated in order to maintain the hot heel liquid. However, to have a hot heel that is much larger than that minimum in relation to the mass of the scrap beyond the hot heel surface is not necessary. On the contrary, a too large hot heel is waste of energy. By limiting the relative amount of hot heel, the productivity of the processes is taken into consideration and an upper limit according to this embodiment therefore is advantageous with regards to the productivity aspect.

For the embodiment where the minimum mass of the hot heel is defined with $R=0.75$, the maximum mass according to this embodiment is defined by R being smaller than 1.125. For the embodiments where $R_{min}$ is 1 and 1.2, respectively the corresponding $R_{max}$ will be 1.5 and 1.8, respectively.

According to a further preferred embodiment, the start of the EMS is at least before 20% of the total melting process has passed.

As mentioned above, one of the important aspects of the invention is that it will allow the application of EMS at an earlier stage of the process, and thereby gain from the advantages of EMS during a longer period. With this embodiment the period during which EMS cannot be applied is reduced to less than the half according to conventional technique.

According to a further preferred embodiment, the start of the EMS is at least before 10% of the total melting process has passed. The application time for EMS according to this embodiment thus is still further increased and thereby the advantages relating to such stirring.

According to a further preferred embodiment, the start of the EMS is at least before 2% of the total melting process has passed. This means that the EMS starts practically from the very beginning of the process, which is particularly advantageous.

According to a further preferred embodiment, the mass of the hot heel and the mass of hot metal charge together is at least 30% of the total mass of steel in the furnace at the end of the process.

This is a further criterion for securing a sufficient amount of steel in liquid phase in the furnace to provide conditions for an effective EMS. With this criterion also further effects influencing the heat balance in the furnace content are taken into consideration, namely the effect of the scrap mass that initially is above the surface of the hot heel, the effect of charging further scrap later during the process in case multi-bucket charging is utilized and the effect of supplying hot metal, i.e. liquid metal during the melting process.

According to a further preferred embodiment, the mass of the hot heel and the mass of hot metal charge is at least 30% of the total mass of steel in the furnace at any stage of the process.

This embodiment further contributes to assure that the EMS will operate sufficiently during the complete process.

According to a further preferred embodiment, the mass of the hot heel and the mass of hot metal charge together is less than 60% of the total mass of steel in the furnace at the end of the process.

Thereby the criterion related to the influence of the components of the bath that are added after the initial charging are taken into consideration for the upper limit of the hot heel in order to avoid an amount of hot heel that is above what represents an efficient productivity.

According to a further preferred embodiment, the mass of the hot heel and the mass of hot metal charge is less than 60% the total mass of steel in the furnace at any stage of the process.

This embodiment correspondingly will further contribute that the mass of the hot heel is limited to maintain efficient productivity.

According to a further preferred embodiment the size distribution of the pieces in the scrap initially supplied to the hot heel is determined.

The mass of the scrap that will be below the surface of the hot heel is dependent on the structure of the scrap. Due to the irregular shape and different sizes of the pieces in the scrap, there will be much void between the pieces such that the overall density including the voids will be much lower than the density of the scrap pieces as such. This density normally is in the range of 2-3 kg/dm$^3$. This can thus be used as guidance when calculating the mass of the hot heel required in order to fulfill the criterion according to the invention. By determining the size distribution of the pieces in the scrap, said overall scrap density can be more precisely assessed. Thereby the criterion for the mass of the hot heel will have increased accuracy resulting in a better possibility to provide an optimal hot heel mass with respect to on one hand assure sufficient hot heel mass for the EMS and on the other hand avoid a too large hot heel with respect to productivity.

Determining the size of the pieces in the scrap might include determining the size of every piece or of only a representative selection of the pieces.

The size distribution also affects the heat transfer from the hot heel to the scrap. The larger the pieces in the scrap are, the slower the heat transfer will be. With knowledge of the size distribution also this effect can be taken into consideration when determining the optimal mass of the hot heel.

According to a further preferred embodiment the geometry of the pieces in the scrap is determined.

This contributes further to asses a more precise value of the overall scrap density and also affects the intensity of the heat transfer, resulting in advantages of the kind mentioned next above. Also when determining the geometry it can be made for each piece or for only a representative selection of the pieces.

The above described preferred embodiments of the invention are specified herein. It is to be understood that further preferred embodiments of course can be constituted by any possible combination of the preferred embodiments above and by any possible combination of these and features mentioned in the description of examples below.

The invention will be further explained through the following detailed description of examples thereof and with reference to the accompanying drawings.

DETAILED DESCRIPTION OF THE INVENTION

In FIGS. 1a-e is illustrated an electrical arc furnace (EAF) during different stages of an EAF melting process according to an embodiment of the invention. The EAF 10 comprises an electromagnetic stirrer (EMS) 11 and electrodes 12. A power supply system 13 operatively connected to the electrodes 12 and a process and control device 14 (only illustrated in FIG. 1a) operatively connected to the power supply system 13 and the EMS for the control thereof, are provided.

Through the process and control device 14 the adequate mass of the hot heel can be calculated based on stored and measured values for the parameters in the formula that determines the mass of the hot heel. The hot heel is entirely or at least to a major part is formed by the melt that is left in the furnace after discharging of the previous process cycle. Therefore the calculation of the adequate hot heel mass preferably is made already just before the discharge of the previous melting process.

Figures 1A, 1B, 1C, 1D, 1E:
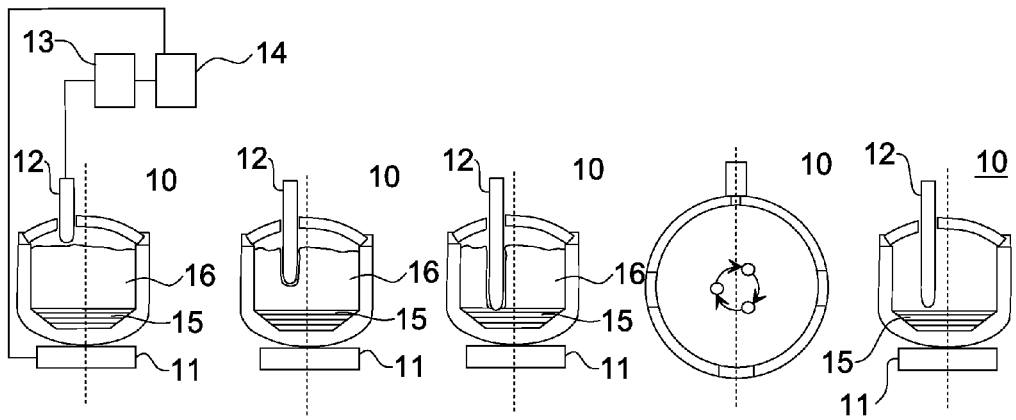
FIGS. 1a-e display schematically in side (FIGS. 1a-c and 1e) and top (FIG. 1d) elevation views of an EAF to which the method according to the invention is suitable.

FIG. 1a illustrates an arc ignition stage wherein a hot heel 15 has been left in the EAF 10 from an earlier process cycle, i.e. when the melted metal scrap was emptied in the earlier process cycle a controlled amount of melted metal scrap, i.e. the hot heel 15, was left in the EAF for the following melting cycle. Further a controlled amount of solid metal scrap has been loaded into the EAF 10. The arcs between the electrodes 12 and the scrap are ignited.

FIG. 1b illustrates a boring stage wherein the electrodes 12 are melting solid metal scrap 16 while penetrating further down into the metal scrap 16. The melt is now consisting of the hot heel 15 and some melted scrap. The electrical power consumption and oxygen supply flow during the arc ignition and boring stages of FIGS. 1a-b are illustrated in FIGS. 2a-b as occurring between about 6 and 12 minutes from the start of the process.

Next an optional hot metal charge is performed. Here, the melted metal is supplied to the EAF from a steelmaking facility (not illustrated). During the hot metal charge, which occurs between about 12 and 17 minutes from the start of the process. No electrical power is supplied to the electrodes 12 and no oxygen is supplied to the EAF 10.

Thereafter the main melting process is performed as illustrated in FIGS. 1c-d, during which the electrical power and the oxygen supply flow are maximum. Next an optional refining stage is performed as being illustrated in FIG. 1e with lower power to heat the melt to tapping temperature. The main melting and refining stages occur between about 17 and 37 minutes from the cycle start, during which the electrical power is stepwise decreased. The EAF melting process cycle ends with the emptying of the melted metal scrap except for the hot heel required for the next melting cycle.

Figure 2A:
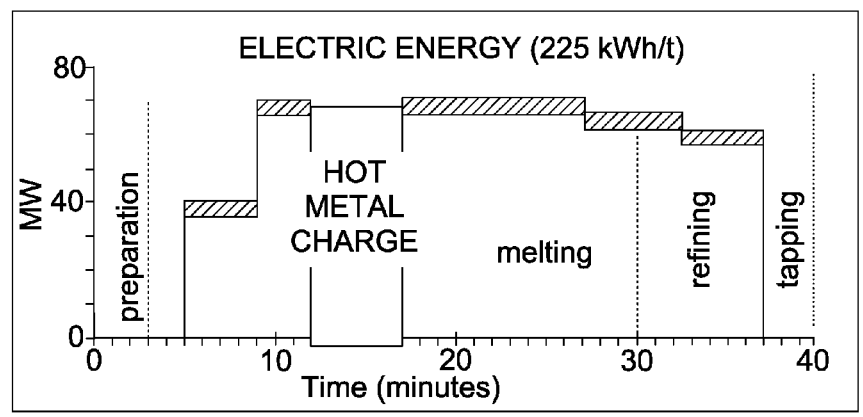
FIGS. 2a-b display in diagrams electrical power consumption (FIG. 2a) and oxygen supply flow (FIG. 2) as a function of time during melting of scrap in an EAF melting process according to an embodiment of a process according to the invention as compared to prior art melting process.
Figure 2B:
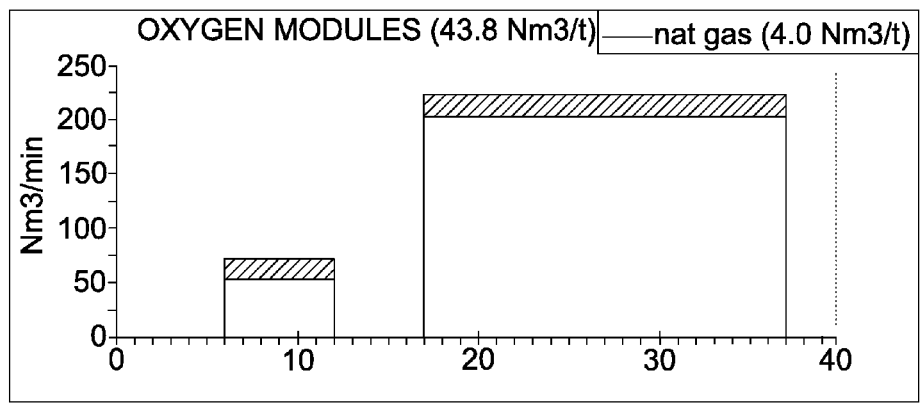

FIG. 2a is a diagram of the electrical power consumption during the EAF melting process according to the invention as compared to the electrical power consumption for a prior art melting process, represented by the lower and upper lines of the sectioned parts in the diagram, respectively. Similarly, FIG. 2b is a diagram of the oxygen supply flow during the invented EAF melting process as compared to the oxygen supply flow for a prior art melting process.

What is claimed is:

1. A method for melting steel in an electric arc furnace (EAF), said method including steps of
providing a hot heel in the EAF,
loading metal scrap into the EAF, and
melting the metal scrap in the EAF,
wherein a mass of the hot heel provided is according to a formula:

$$m_h = R \frac{(T_m - T_s)C_p^s}{(T_h - T_m)C_p^l + Q} m_s$$

where $m_h$ is the mass of the hot heel provided, $m_s$ is the mass of an initially loaded scrap that is beyond a surface of the hot heel, $T_m$ is the melting temperature of the scrap, $T_s$ is the temperature of the scrap at loading thereof, $T_h$ is the temperature of the hot heel at the loading of the scrap, $C_p^s$ is the specific heat capacity of the scrap, $C_p^l$ is the specific heat capacity of the hot heel, Q is the specific melt heat for the scrap and R is a coefficient that is at least 0.75, wherein electromagnet stirring (EMS) is applied to at least the melting step, and wherein the mass of the hot heel provided is calculated by a process and control device using stored and/or measured values for $m_s$, $T_m$, $T_s$, $T_h$, $C_p^s$, $C_p^l$, Q, and R applied to the formula.

2. The method according to claim 1, wherein R is at least 1.

3. The method according to claim 2, wherein R is at least 1.2.

4. The method according to claim 1, wherein the mass of the hot heel is less than 1.5 times a minimum specified according to the invention.

5. The method according to claim 1, wherein a start of the EMS is at least before 20% of a total melting process has passed.

6. The method according to claim 5, wherein the start of the EMS is at least before 10% of the total melting process has passed.

7. The method according to claim 6, wherein the start of the EMS is at least before 2% of the total melting process has passed.

8. The method according to claim 1, wherein the mass of the hot heel and the mass of the hot metal charge together is at least 30% of the total mass of steel in the furnace at an end of the melting step.

9. The method according to claim 8, wherein the mass of the hot heel and the mass of the hot metal charge together is at least 30% of the total mass of steel in the furnace at any step in the method.

10. The method according to claim 1, wherein the mass of the hot heel and the mass of hot metal charge together is less than 60% of the total mass of steel in the furnace at a end of the melting step.

11. The method according to claim 10, wherein the mass of the hot heel and the mass of hot metal charge is less than 60% of the total mass of steel in the furnace at any step of the method.

12. The method according to claim 1, wherein size distribution of pieces in the scrap initially supplied to the hot heel is determined.

13. The method according to claim 1, wherein geometry of pieces in the scrap is determined.

* * * * *